United States Patent [19]
Koizumi et al.

[11] Patent Number: 5,406,715
[45] Date of Patent: Apr. 18, 1995

[54] TAPE MEASURE DEVICE

[75] Inventors: Hiroshi Koizumi; Mitsugu Sugawara; Toru Kodato, all of Utsunomiya, Japan

[73] Assignee: Mitutoyo Corporation, Tokyo, Japan

[21] Appl. No.: 81,686

[22] Filed: Jun. 24, 1993

[30] Foreign Application Priority Data

Jul. 7, 1992 [JP] Japan .................. 4-180026
Nov. 27, 1992 [JP] Japan .................. 4-318800

[51] Int. Cl.⁶ ..................... G01B 3/10; G01B 7/02
[52] U.S. Cl. ........................... 33/706; 33/763; 33/769; 33/770; 33/771; 33/512; 33/555.4
[58] Field of Search ............... 33/706, 744, 755, 759, 33/762, 763, 769, 771, 512, 514.1, 555.4, 770

[56] References Cited

U.S. PATENT DOCUMENTS

| | | |
|---|---|---|
| 4,449,179 | 5/1984 | Meyer . |
| 4,473,949 | 10/1984 | Schechtman . |
| 4,483,077 | 11/1984 | Matsumoto et al. . |
| 4,586,260 | 5/1986 | Baxter et al. .......... 33/706 |
| 4,611,402 | 9/1986 | Yamamoto et al. .......... 33/762 |
| 4,635,367 | 1/1987 | Vigede .......... 33/15 |
| 4,743,902 | 5/1988 | Andermo .......... 340/870.37 |
| 4,873,770 | 10/1989 | Luttmer et al. .......... 33/706 |
| 5,027,526 | 6/1991 | Crane .......... 33/763 |

FOREIGN PATENT DOCUMENTS

| | | |
|---|---|---|
| 64-11883 | 2/1989 | Japan . |
| 0010090 | of 1911 | United Kingdom .......... 33/759 |
| 2123955 | 2/1984 | United Kingdom .......... 33/771 |
| 92/02781 | 2/1992 | WIPO . |

*Primary Examiner*—Alvin Wirthlin
*Attorney, Agent, or Firm*—Flynn, Thiel, Boutell & Tanis

[57] ABSTRACT

A tape measure device includes a belt tape member made of a flexible material. A cursor is slidably supported for movement on and along the belt tape member. The cursor includes a housing and an encoder which includes a relative displacement sensor for detecting a relative displacement value between the belt tape member and the cursor. The displacement sensor includes a first electrode made of a conductive ink and printed at predetermined and spaced intervals on and along the belt tape member. The conductive ink first electrode printed on the belt tape member is protectively coated by an electrically nonconductive insulative membrane. A second electrode is provided on the cursor and opposes the first electrode and the insulation membrane. A circuit is provided for creating an electrical capacitance value between the first and second electrodes and for issuing signals in response to a change of electrical capacitance between the first and second electrodes. A display responsive to the signals is provided for indicating the detected relative displacement value between the belt tape member and the cursor thereon.

16 Claims, 9 Drawing Sheets

TAPE MEASURE DEVICE

BACKGROUND OF THE INVENTION

1. Field of the Invention

This invention is broadly concerned with a tape measure device for digitally indicating a measured length thereon and intended particularly to be used in a physical examination and a measurement of a suit.

2. Description of the Related Art

A tape measure device for indicating digital measured data has previously been assembled with an encased winding reel to collect a tape measure in a case and in such a state that it can be pulled out easily, some sprocket wheels responsive to the wind up of the tape measure and an encoder to detect the number of revolutions of one of the sprocket wheels. The measured data is determined based on the number of revolutions of the sprocket wheel or the tape measure length pulled out of the case.

Such a conventional tape measure is used in such a manner that a forward end of the belt tape member is first oriented to one side edge of an object to be measured by one hand and the case is then carried toward the other side edge of the object by the other hand while tape is pulled out of the case. The number of revolutions of the sprocket wheel in response to a pulled out amount of the tape is measured and displayed on the digital display. This case movement is continued until a slit provided in the case for facilitating an in-and-out movement of the tape reaches to the other side edge of the object. The necessary measured value is therefore known in a digital format through the digital display.

This type tape measure device involves a disadvantage in size because it has to house the winding reel for the tape measure and some sprocket wheels. To make the tape measure device small in size is naturally limited as the winding reel and the sprocket wheels have to have a certain size to facilitate a measurement for a long object and to convert the pulled out amount of the tape measure into the number of revolutions of the sprocket wheel.

As has been mentioned above, it can be said that the conventional tape measure device is not handy to carry, since the case size can not be made small. In particular, the case is not convenient to be held by one hand when measuring and to be moved onto and in contact with a periphery of an uneven object. This may be one of the main reasons that the general public today does not experience a fairly wide use of the digital-type tape measure device.

A negative factor to the miniaturization of the case may cause a limitation of measurement points. Taking for an instance to measure a bottom portion of a ditch, the case of the tape measure device should be able to enter into the ditch, which is generally impossible, so that the ditch which can only be measured by the conventional tape measure device necessarily having a large inside space in which to receive the tape measure device in its entirety.

It is an object of the present invention to break off such disadvantages and to provide a developed tape measure device which is handy to carry and further available to a long object with a relatively short tape measure.

SUMMARY OF THE INVENTION

The tape measure device according to the present invention is characterized by a belt tape member made by a flexible material, a cursor provided on the belt tape member are supported to slide thereon, an encoder including a displacement sensing element printed entirely on the belt tape member so as to detect a relative displacement value between the displacement sensing element and the cursor, and a display in digital format to indicate the detected value.

The encoder could further include another displacement sensing element on a side of the cursor in such a manner to confront with the displacement sensing element on the belt tape member. Incidentally, the belt tape member is made by an electrically non-conductive material and the encoder consists of a first displacement sensing element having first electrodes provided on and along the belt tape member at predetermined intervals, a second displacement sensing element provided on the side of the cursor and having second electrodes confronting with the first electrodes, and a circuit capable of issuing signals in response to any change of electrical capacitance between the first and the second electrodes.

The electrically non-conductive material could be a vinyl chloride containing glass fiber. The surface of the electrodes on the belt tape member is coated by an insulation membrane. The electrodes of the belt tape member could be printed with a conductive ink at predetermined intervals. The conductive ink may be composed of a carbon paste and neodymium or with a silver paste and a neodymium.

The belt tape member could be provided at endmost portions thereof with a two part connection member of which one part is capable of connecting and disconnecting to each other. The one part or connection half-member is defined by plural loop-shaped ring members and the other part or connection half-member is defined by plural hook members meshable with the one connection half-member so that the both connection half-members are detachably connected to each other.

The belt tape member may be provided thereon with a graduation so as to be read with the eyes. The belt tape member may have knob members at both endmost portions thereof and the cursor is formed to have a standard measurement location and is provided with a clip member on the backside so as to hold either of the knob members at the standard measurement location. Each of the knob members has a width bigger than the belt tape member and is shaped to have a dent to fit the curvature of a surface of the user's thumb. The cursor is preferably provided with a clip member on the backside thereof to orient one of the knob members at the measurement standard.

The cursor is generally provided with a zero-setting switch to reset a numerical value indicated on the display and a hold switch to keep a detected numerical value on the same. The display may be provided on the cursor. The cursor is defined by a front half-case having thereon the display and a back half-case being adapted to detachably attach to the back of the front half-case. The back surface of the cursor is made flat and the front of the same is formed to fit one hand.

When measuring, the standard measurement location on the cursor is first oriented at one end of an object to be measured and thereafter the cursor is carried on the object and in a lengthwise direction of the belt tape member to measure a relative displacement value between the cursor and the belt tape member by means of the encoder to thereby indicate the measured length value on the display. The measurement of the object can be completed when the standard measure location on the cursor will be reached at the other end of the object. An accurate dimension of the object can be known from the indicated numerical value on the display.

When taking a chest measurement, the value indicated on the display is reset into 0(zero) in a state that one knob member is oriented to the standard measurement location. The belt tape member is pulled out to surround the chest and then the knob member attached to the endmost portion of the pulled out belt tape member is engaged to the clip member. Thereafter, the cursor 20 is moved by the user on the belt tape member in such a way as to stretch or tighten the belt tape member so as to enable an accurate dimension of the chest and to thereby obtain the accurate measured value on the digital display.

DETAILED DESCRIPTION OF THE PREFERRED EMBODIMENT(S)

The preferred first embodiment of a tape measure device according to the present invention will now be described with reference to the FIGS. 1-4.

Figure 1:
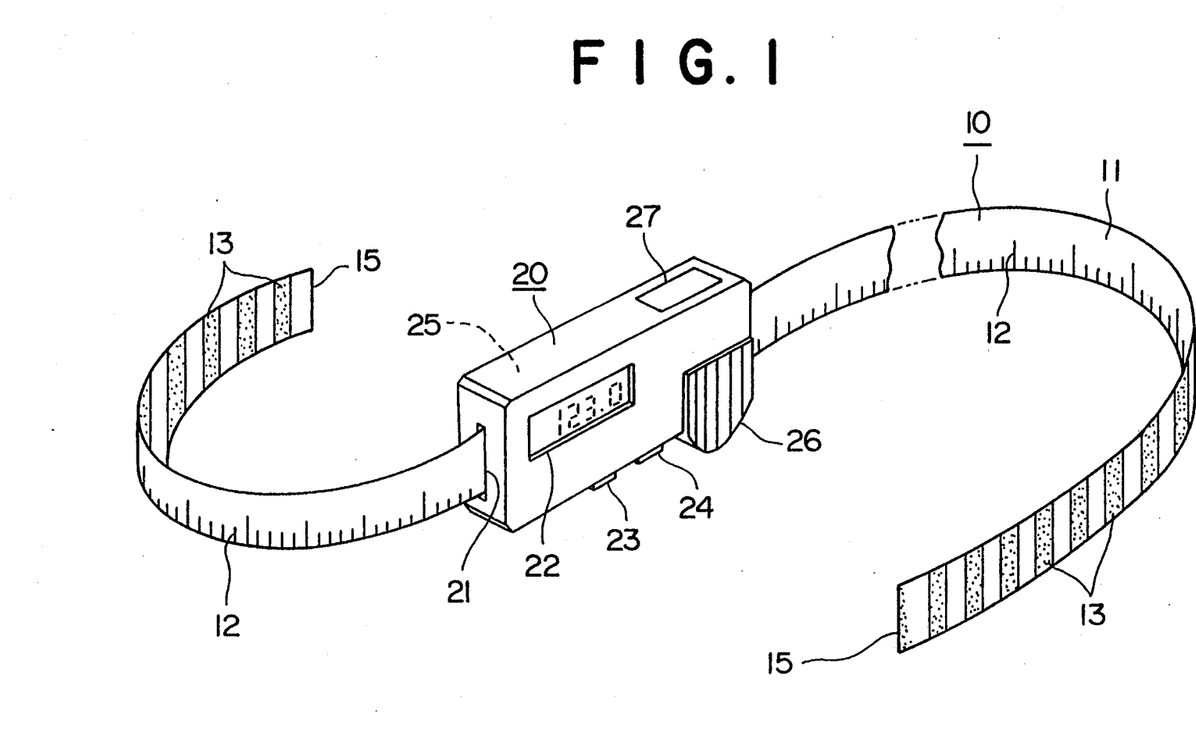
FIG. 1 is a perspective view of the appearance of the overall composition of a first embodiment of a tape measure device and according to the present invention.

FIG. 1 is a perspective view depicting the tape measure device in the first embodiment. The tape measure device essentially consists of a belt tape member 10 and a cursor 20 capable of slidably moving on the belt tape member 10. The belt tape member 10 comprises a base tape 11 which is made of a material having a sufficient amount of flexibility and an preferable insulating characteristic, such as a vinyl chloride containing glass fiber and having a uniform width along its entire length. On one side of the base tape 11, a visible graduation 12 to be read with the eyes is provided in a longitudinal direction and at a certain spacing from one another and, on the other side thereof, plural narrow lattice electrodes 13 made of a conductive material are provided in the same manner.

Figure 2:
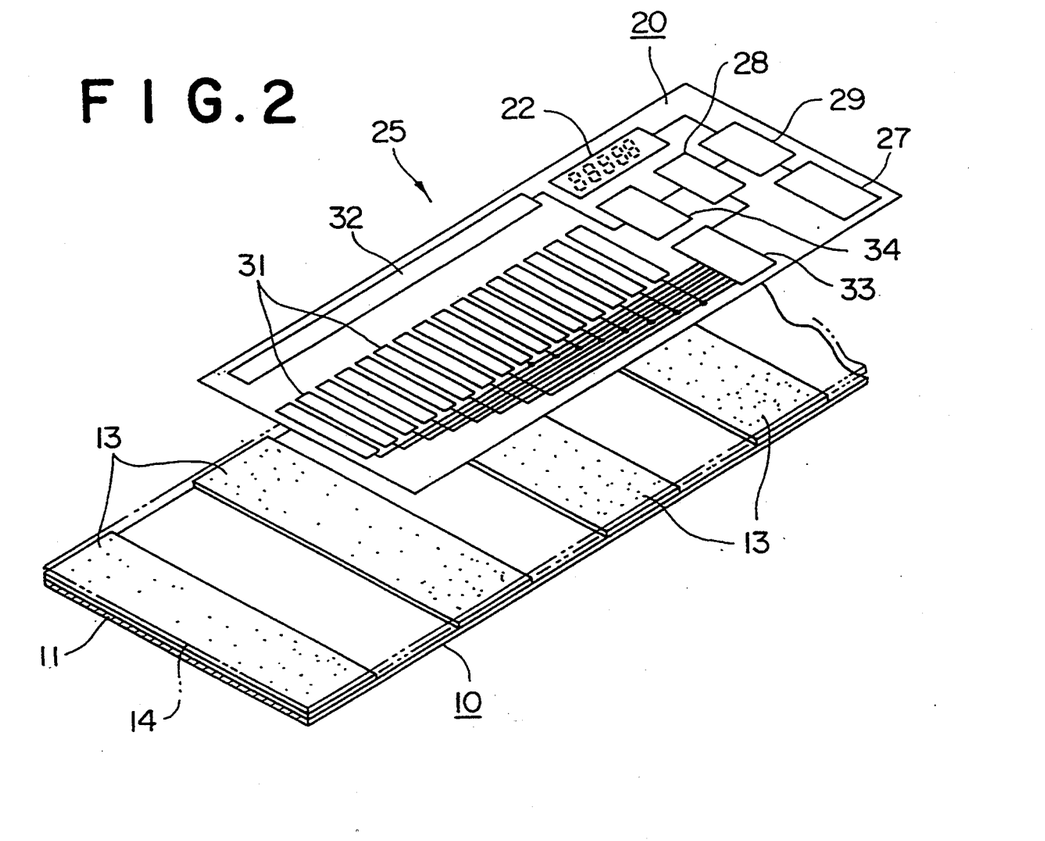
FIG. 2 is an enlarged view depicting a capacitance type encoder used in the first embodiment.

The narrow lattice electrodes 13 can be printed easily and preferably on the base tape 11 by, for example, using a conductive ink, a silver paste and carbon. Incidentally, as shown in FIG. 2, the surface of the lattice electrodes 13 are covered entirely by an insulation membrane 14, such as a polyethylene film.

Figure 3:
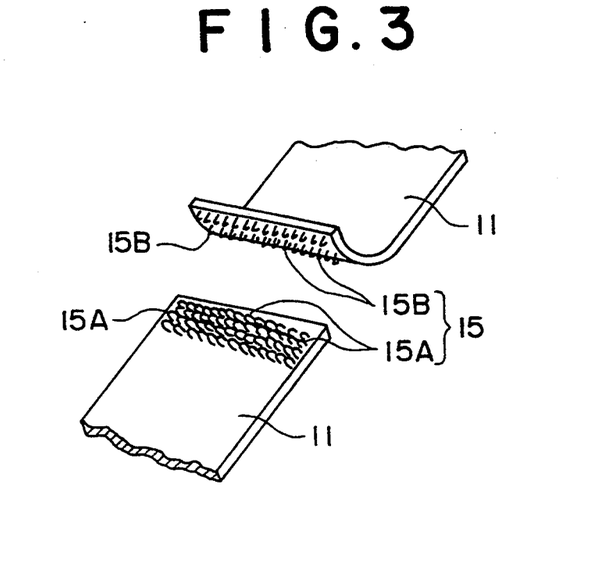
FIG. 3 is a perspective view of a connection member.

There is provided at both endmost portions of the base tape 11 a connection member 15 to connect the belt tape member 10 end-to-end. As shown in FIG. 3, the connection member 15 can be defined by a first connection half-member 15A having plural elements in the form of a loop and respectively provided at one endmost portion of the base tape 11 and a corresponding second connection half-member 15B which can relate to the half-member 15A. The connection member 15 may be the magic tape type or the BELKURO or VELCRO (Trademark) type.

The cursor 20 includes a housing which has a pair of slits 21 through the confronting end walls thereof so as to receive therein the belt tape member 10, a digital indication device 22 as an indication means on a front wall surface thereof, and a zero-setting switch 23 and a hold switch 24 on a lower side wall thereof respectively. The cursor 20 further encloses a capacitance type encoder 25 and associated circuits (not shown) to detect a value of the relative movement of the cursor 20 and the belt tape member 10. As can be seen from the drawing, a reference numeral 26 references a finger rest and a numeral 27 references a sender.

At each of the peripheral portions of the slits 21 in which the belt tape member 10 reciprocally moves, there is provided a brush preventing an invasion of dust clung to the belt tape member 10 into the cursor 20.

The capacitance type encoder 25 comprises one displacement sensing element defined by the lattice electrodes 13 arranged on the belt tape member 10 at certain intervals and earth or grounded electrodes (not shown) oriented intermediate the lattice electrodes 13, the other displacement sensing element enclosed inside the cursor housing 20 and defined by a sending electrode 31 consisting of plural sets of eight-sending electrode elements each arranged along a movement direction of the belt tape member 10 at certain intervals and a receiving electrode 32 which lies coextensively along the sending electrodes 31, a sending circuit 33 applying sending signals at a different phase of 8/360 degrees to each set of sending electrode elements, and a receiving circuit 34 receiving signals from the receiving electrode 32 wherein the phase changes are based upon the relative movement of the sensing electrode 31 and the lattice electrodes 13. A measurement principle of the capacitance type encoder described above is known in Japanese Patent Application Publication No. 64-11883 or in Swedish Patent No. 7714010-1.

The output from the receiving circuit 34 that is the output from the capacitance type encoder 25 is calculated by means of a counter 28 and, through a CPU 29, is then continuously indicated in a digital format on a digital indication device 22. The calculated value in the counter 28 can be set by 0 (zero) when pushing the zero-setting switch 23 and can be kept at a presently shown value when pushing the hold switch 24. If necessary to send the calculated value to an outside data processing apparatus to further process and read the values in print, the value processed in the CPU 29 can be sent thereto through the sender 27 by a wire circuit or radio transmission system.

While the operation of the device will be obvious to those skilled in the art, a brief explanation of the operation will be given for convenience.

At the beginning of the measurement by using the tape measure device according to the present invention, a standard measurement location edge of the cursor 20, that is, either movement direction side is first placed at one side edge of an object to be measured and to set an indication value on the digital indication device 22 to 0 (zero) by pushing the zero-setting switch 23. When the cursor 20 is moved on the periphery of the object to be measured and slid along and relative to the belt tape member 10 in the lengthwise direction thereof, the relative movement of the cursor 20 and the belt tape member 10 can be detected by the capacitance type encoder 25 to be digitally indicated on the digital indication device 22. As the standard measurement location edge of the cursor 20 reaches the other side edge of the object to be measured, the value indicated on the digital indication device 22 can be kept upon operating the hold switch 24. Accordingly, the operator can measure a necessary dimension of the object to be measured without fail by reading the presently indicated value on the digital indication device 22.

Figure 4:
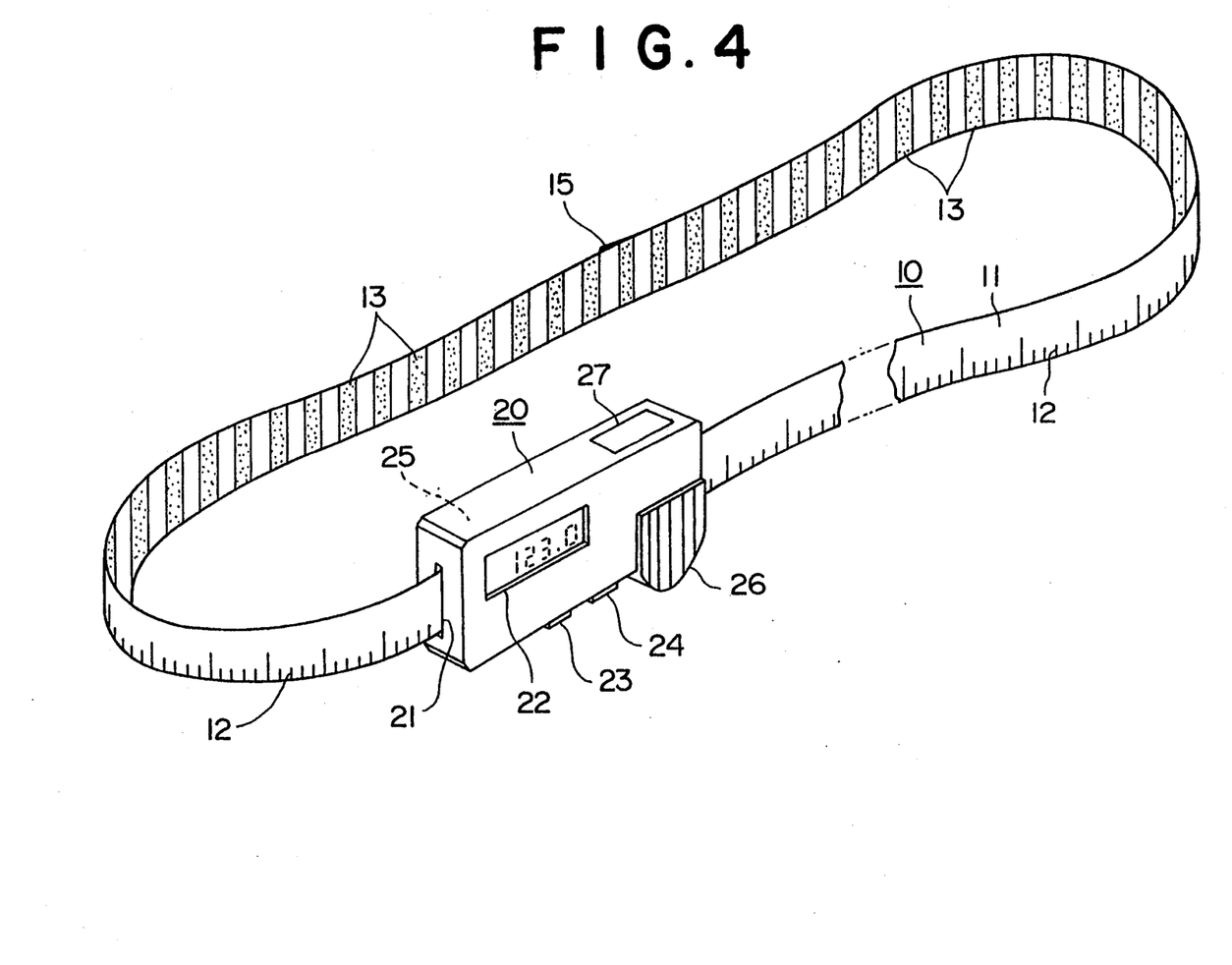
FIG. 4 is a perspective view showing a state that a belt tape member is shaped into a ring by means of the connection member.

In case that a necessary dimension of the object to be measured seems to be longer than the entire length of the belt tape member 10, the belt tape member 10 should be connected end-to-end by means of the connection member 15 into a ring shape. The cursor 20 can slide along the now endless belt tape member 10 on the periphery of the object to be measured through several lengths of the tape so that the movement of the standard measurement edge of the cursor 20 begins from the one side edge location of the object to be measured to thereby effect a measurement dimension longer than the length of the belt tape member 10.

Accordingly to the above described first embodiment, the cursor 20 can be made relatively small in size Compared with a conventional one, because there are provided the flexible belt tape member 10, the cursor 20 moving slidably along the belt tape member 10, the capacitance type encoder 25 to detect a relative displacement value of the lattice electrodes 13 printed at prescribed intervals on the belt tape member 10 and the sending and receiving electrodes 31 and 32 provided in the cursor 20, and the digital indication device 22 on the cursor 20 so as to indicate the output from the encoder 25.

In other words, the inventive tape measure device does not require any sprocket wheel responsive to a pulling out of the tape member unwound from the winding reel so that the cursor 20, can be made small in size as compared with the conventional one. Such a cursor 20 can be carried in one hand to move gently over the undulating periphery of the object to be measured to thereby improve the operation of the tape measure device. It will be further available to measure a fairly small bottom portion of a groove.

As the belt tape member 10 is provided with a pair of the connection half-members 15A and 15B to form the belt tape member 10 into a ring shape, the cursor 20 can slidably move on the endless belt tape member 10 continuously to measure the entire length of the periphery of the object to be measured without requiring the length of the belt tape member 10 to be the same as the entire length of the object. An interconnection and detachment between the connection half-members 15A and 15B is easily accomplished before conducting such operation.

The outermost surface of the belt tape member 10 is covered with the insulation membrane 14, such as polyethylene film to seal the lattice electrodes 13 provided on the base tape 11, so that the lattice electrodes 13 do not become damaged. If necessary, the visible graduation 12 can be printed on the insulation membrane 14 directly. As the cursor 20 is associated with the zero-setting switch 23 and the hold switch 24, a measurement can start from a voluntary position on the object to be measured upon an operation of the zero-setting switch 23 and thereafter the measured and indicated value can be held by operating the hold switch 24 to allow same to be easily read. It will be of course possible to send out the measured data through the sender 27 for further processing.

As can be noted from the drawings, the visible graduation 12 printed on the belt tape member 10 will be useful to know an approximate value with the eye.

The preferred second embodiment of the present invention will be further described with reference to FIGS. 5 through 10. This second tape measure device is mainly and preferably considered from conducting a measurement of a suit, but the same reference numerals will be used to designate the same or similar components as those in the first embodiment, so that descriptions will be omitted or simplified.

Figure 5:
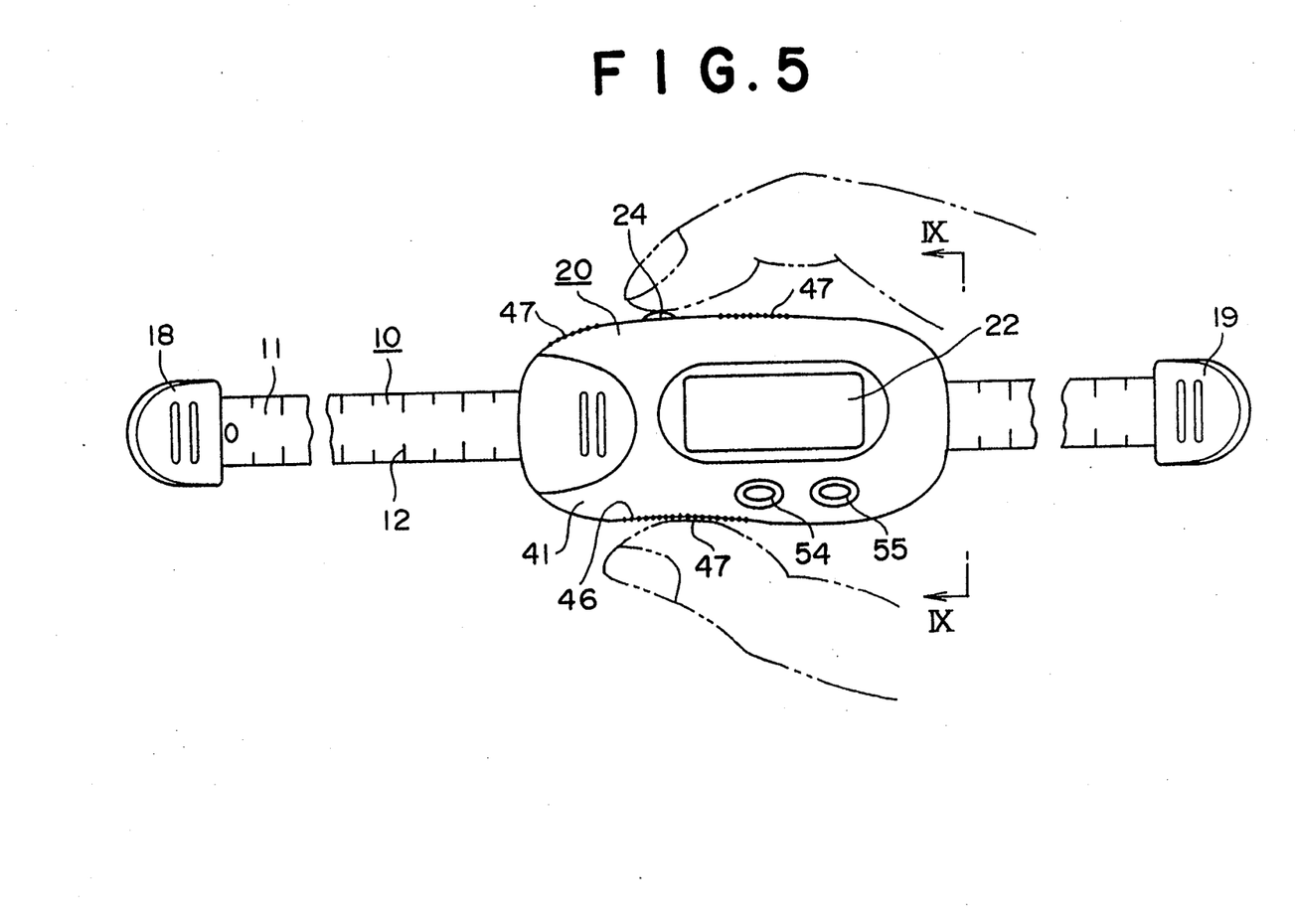
FIG. 5 is a front view depicting a second embodiment of a tape measure device and according to the present invention.
Figure 6:
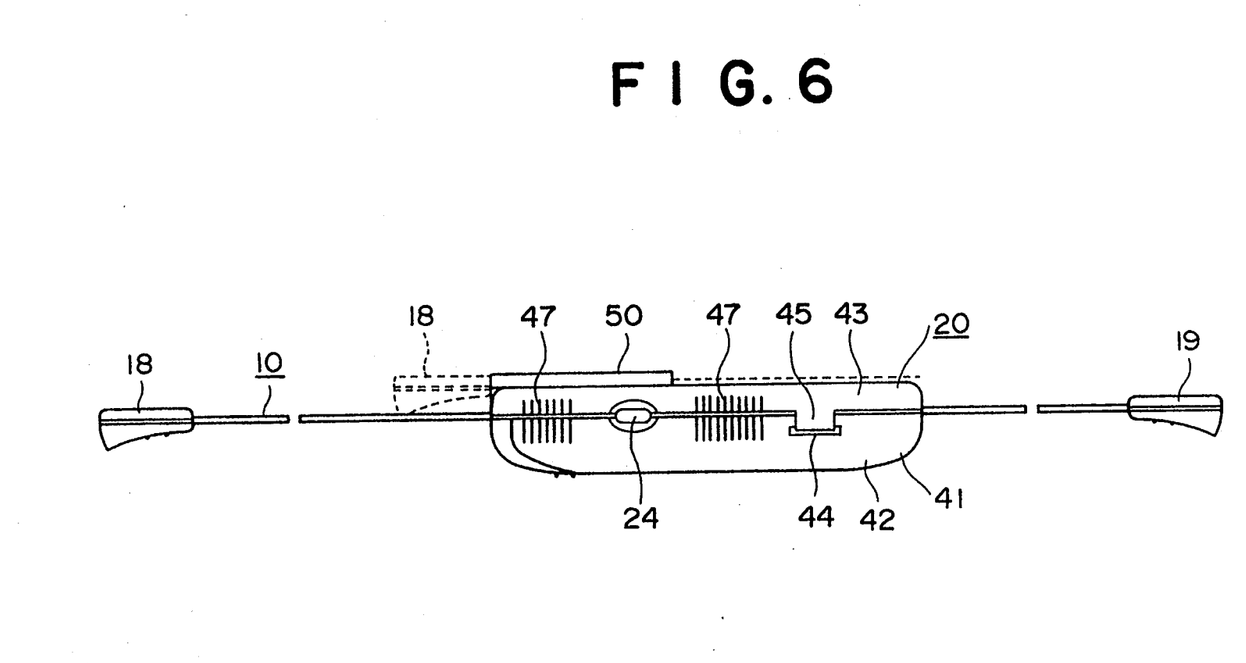
FIG. 6 is a plane view depicting the tape measure device in the second embodiment.
Figure 7:
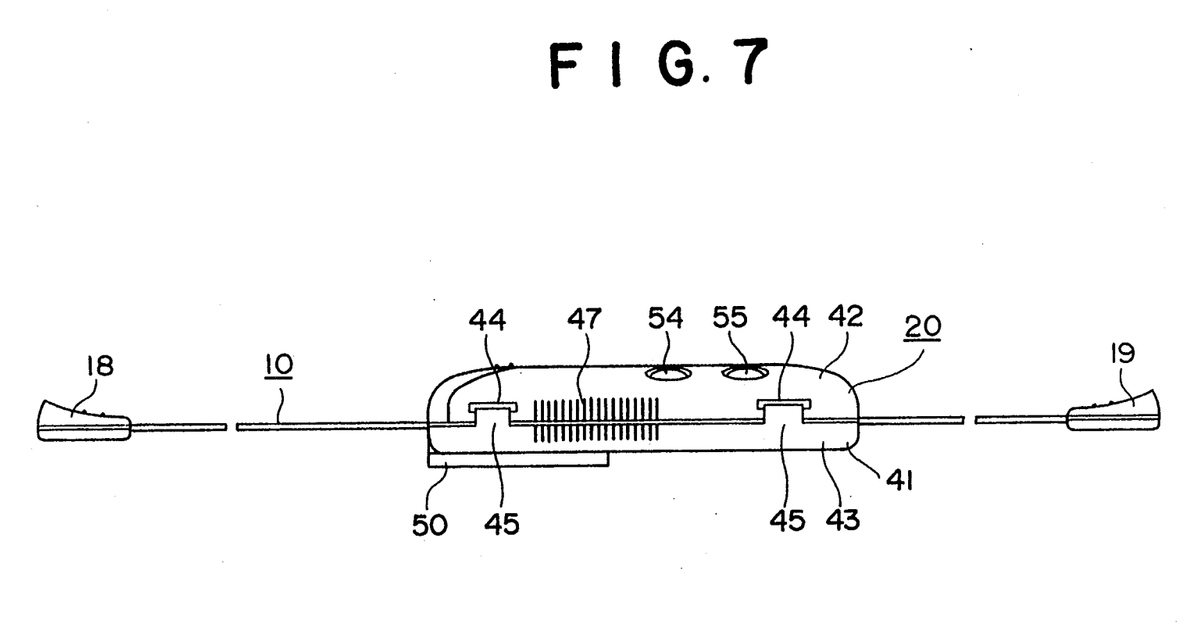
FIG. 7 is a bottom view of the tape measure device shown in FIG. 6.

FIGS. 5, 6 and 7 are respectively depicting a front view, an upper side plane view thereof and a bottom side plane view thereof in the second embodiment. As shown in these drawings, a tape measure device of the second embodiment can be generally defined by the belt tape member 10 and the cursor 20 defined in the first embodiment. The belt tape member 10 in this embodiment has a length of around 2.5 m.

Figure 8:
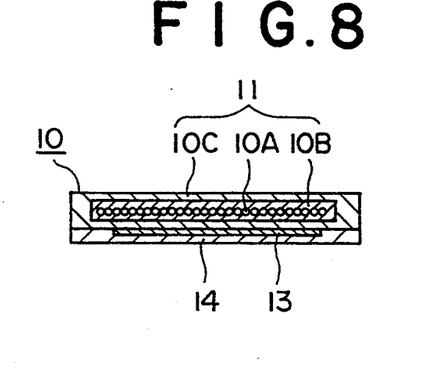
FIG. 8 is a sectional view depicting a belt tape member used in the second embodiment.

As shown in FIG. 8, the belt tape member 10 has a base tape 11 wherein plural glass core lines 10A and polyvinyl chloride sole coat 10B are composed in a soft polyvinyl chloride coat 10C. Plural lattice electrodes 13 of the belt tape member 10 in the second embodiment is made by a conductive ink consisting of a 50 percent carbon paste and a 50 percent neodymium or by a conductive ink consisting of a 50 percent silver paste and a 50 percent neodymium at a certain spacing from one another on one side of the base tape 11.

It will be noted in FIGS. 5 through 7 that the base tape 11 has at both endmost portions knob members 18 and 19. These knob members 18 and 19 have a width bigger than the base tape 11 and are shaped to have a dent therein to just fit the curvature of a surface of the thumb when moving the base tape 11 relative to the cursor 20.

Figure 9:
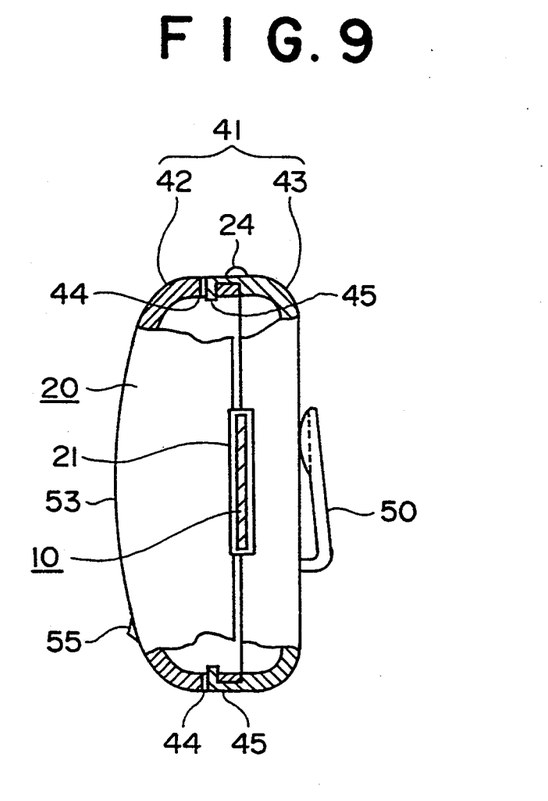
FIG. 9 is a sectional view taken along the IX—IX line in FIG. 5.

The cursor 20 has a case 41. This case, as shown in FIG. 9, is defined by a front half-case 42 which can fit an operator's hand when being carried and a back half-case 43 which engages with the front half-case 42 and of which an outer surface thereof is flattened. The front half-case 42, in FIG. 9, has one through hole 44 on the upper surface and two further through holes 44, 44 on the lower surface. The back half-case 43 is provided with three claws 45 each of which can engage and connect to the mentioned holes 44, respectively to thereby allow the back half-case 43 to be detachably attached to the back of the front half-case 42. The case 41, in FIG. 5, is further provided with a depression 46 on the lower surface to fit the curvature of the operator's thumb when being carried and non-skid portions 47 on the surface of the depression 46 and on the upper surface opposite thereto as well.

The case 41 further has two slits 21 on a parting line between the front half-case 42 and the back half-case 43 and on the confronting surfaces with reference to the belt tape member 10 so as to receive the belt tape member 10 therethrough. There is provided a hold switch 24 on the upper side of the case 41 as shown in FIG. 9. There are provided, on the surface of the front half-case 42, a digital indication device 22 at the central portion thereof, a switch 54 remote from and lower than the digital indication device 22 to cut the power supply and a switch 55 next to the switch 54 to switch on and reset a presently indicating value on the digital indication device 22.

The outer surface of the back half-case 43 is provided with a clip member 50 to orient and engage a base edge portion of the knob member 18 to the standard measurement location side of the cursor 20 in a state depicted by a dotted line in FIG. 6. The clip member 50 has a sectional shape extending straight out from the surface of the back half-case 43 and curbing upwardly to approach the back surface gradually as shown in FIG. 9.

The case 41 encloses the same capacitance type encoder 25 and other accompanied circuits all together therein as those in the first embodiment to measure the relative movement between the cursor 20 and the belt tape member 10, so that any further descriptions can be omitted.

The operation of the tape measure device in the second embodiment is to be considered the same as the first embodiment. But, as mentioned at the beginning of the description for the second embodiment, this second embodiment is intended to conduct the measurement of a suit, so that a brief explanation of the operation will be given for convenience with reference to FIG. 10.

Figure 10:
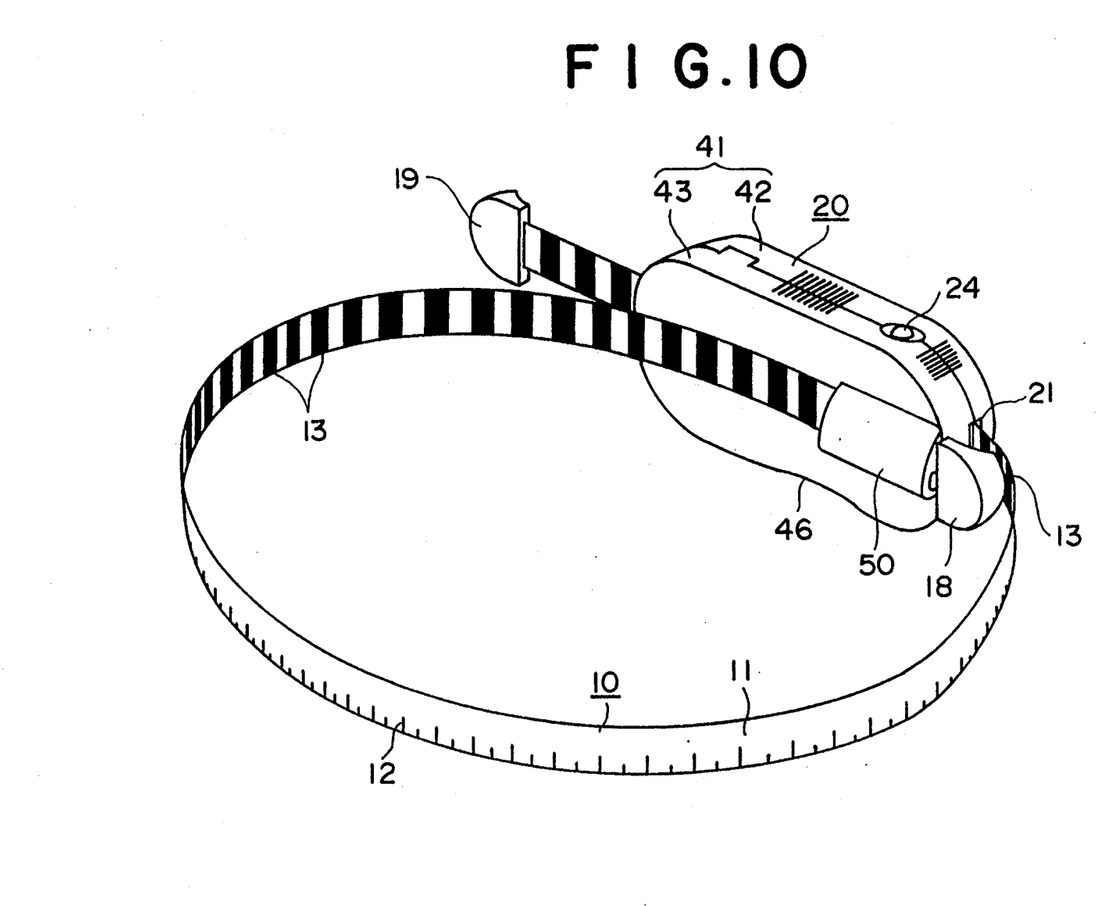
FIG. 10 is a perspective view depicting a state that the belt tape member in the second embodiment is shaped into a ring.

When taking a chest measurement, the knob member 18 is first oriented to the standard measurement location edge of the cursor 20 as the original staring point and to reset a presently indicating value on the digital indication device 22 to 0 (zero) by operating the zero-setting switch 55. The knob member 18 is pulled out from its starting position by the fingers to surround the chest and is then hooked on the clip member 50. Accordingly, the base edge of the knob member 18 is oriented to the standard measurement location edge of the cursor 20 to hold one end of the belt tape member 10. Thereafter, the cursor 20 is moved by the user in such a manner on the belt tape member 10 to stretch or tighten the belt tape member 10 so as to measure an accurate dimension of the chest to thereby obtain the accurate measured value on the digital indication device 22.

The tape measure device in the above-mentioned second embodiment is naturally able to attain the same objects as those in the first embodiment. The belt tape member 10 has at both endmost portions the knob members 18, 19 respectively and the cursor 20 is provided on the back surface with the clip member 50 to temporary hold the knob member 18 at the standard measurement location edge of the cursor 20 to thereby facilitate the preferable chest measurement of the operator by himself.

The case 41 of the cursor 20 is assembled with the front half-case 42 and the back half-case 43 in Such a manner that the back half-case 43 is detachably attached to the back of the front half-case 42 be means of the three set of the holes 44 and claws 45, so that the case 41 can be opened easily, if necessary. Hence, the belt tape member 10 can be easily exchanged with a new one because of an abrasion or an unexpected breakage. The flatness on the outer surface of the back half-case 43 will contribute to a temporary and firm holding of the knob member 18 in the clip member 50 and the round shape of the front half-case 42 will facilitate a proper gripping of the cursor 20.

Although particular preferred embodiments of the invention have been disclosed in detail for illustrative purpose, it will be recognized that variations or modifications of the disclosed apparatus, including the rearrangement of parts, lie within the scope of the present invention.

The encoder 25 could be a photo-type one or a magnetic-type one instead of the mentioned capacitance-type encoder to sense the relative movement between the belt tape member 10 and the cursor 20. Alternatively, a resistance type encoder will be also available to attain the same result by such a manner that a resistance value of a resistance line provided on the belt tape member 10 and a distance from a predetermined standard position of the belt tape member 10 to the cursor 20 are compared in a certain method.

Figure 11:
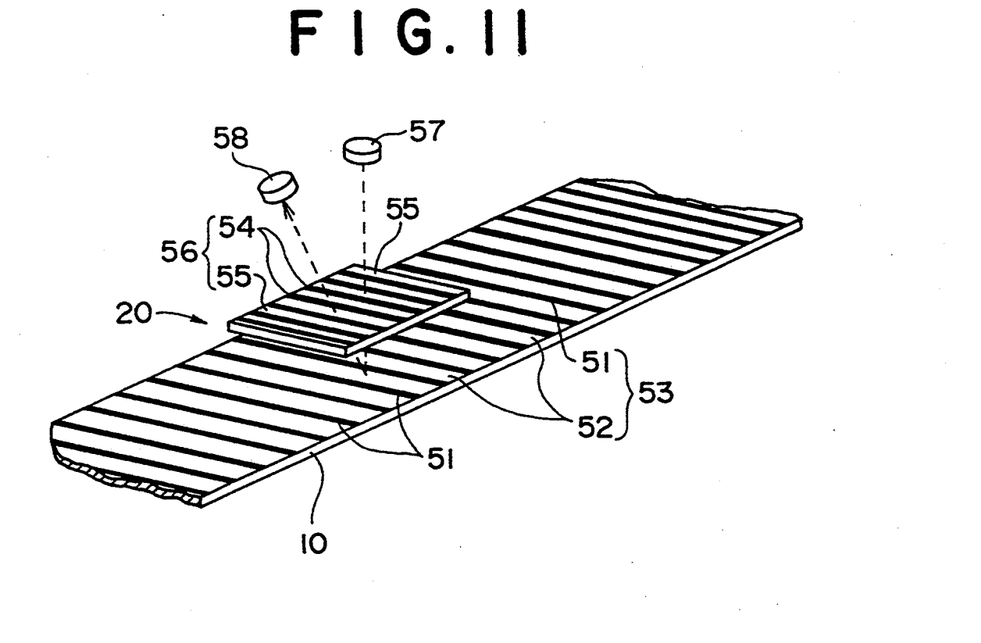
FIG. 11 is a diagrammatic perspective view depicting a modification of the encoder.

The photo-type encoder is schematically illustrated in FIG. 11 wherein a main scale 53 is entirely provided on the belt tape member 10 with plural photo-absorption portions 51 and photo-reflection portions 52 in such a manner that the portions 51 and 52 are arranged to one another of certain intervals therebetween and wherein an index scale 56 is provided with some photo-absorption portions 54 and some photo-reflection portions 55 as those of the main scale 53. There are also provided a light emitting device 57, a corresponding light receiving device 58 and a signal processing circuit (not shown) to receive signals sent from the light receiving device 58 and then to issue pulses in response to a displacement value of the main scale 53. In such a photo-type encoder, the light emitting device 57 and the light receiving device 58 could be positioned to face each other and the main scale 53 and the index scale 56 could respectively have mutually positioned translucent portions and light insulation portions.

Figure 12:
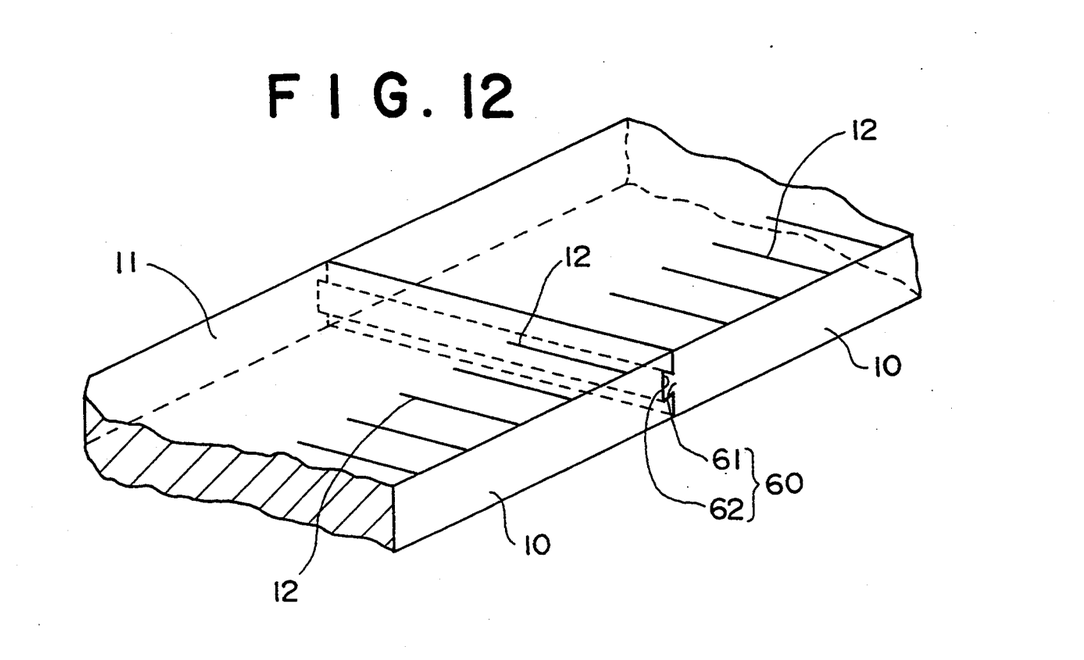
FIG. 12 is a diagrammatic perspective view depicting a modification of the connection member.

The knob members 18 and 19 attached to both endmost portions of the belt tape member 10 in the second embodiment may be adapted to detachably connect both endmost portions thereof to each other. The endmost portions of the belt tape member 10 could be interconnected to each other by means of a connection member 60 defined by a inverted truncated triangle shape projection 61 on one end surface of the belt tape member 10 and a corresponding groove 62 connecting to the projection 61, as shown in FIG. 12.

The base tape 11 of the belt tape member 10 could be made of another material instead of the vinyl chloride containing glass fiber as long as the base tape 11 has sufficient flexibility.

As has been mentioned above, the tape measure-device according to the present invention is handy to carry and attains a wide range of measurement with a rather short belt tape member 10.

What is claimed is:

1. A tape measure device, comprising: a belt tape member made of a flexible material;
   a cursor slidably moving on and along said belt tape member, said cursor including a housing;
   an encoder means including a relative displacement sensing means for detecting a relative displacement value between said belt tape member and said cursor, said displacement sensing means including a first electrode made of a conductive ink add printed at predetermined and spaced intervals on and along said belt tape member, said conductive ink first electrode printed on said belt tape member being protectively coated by an electrically nonconductive insulative membrane, and a second electrode provided on said cursor and Opposing said first electrode and said insulative membrane, and a circuit means for creating an electrical capacitance value between said first and second electrodes and for issuing signals in response to a change of electrical capacitance between said first and second electrodes; and a display means responsive to said signals for indicating the detected relative displacement value between said belt tape member and said cursor thereon.

2. A tape measure device according to claim 1, wherein said belt tape member has at both endmost portions thereof a connection member which include a coupling means for coupling and uncoupling said connection members to and from one another.

3. A tape measure device according to claim 2, wherein said coupling means on one connection member is defined by a plurality of loop-shaped ring members and wherein said coupling means on an other connection member is defined by a plurality of hook members operatively couplable to said ring members, so that both connection members are detachably connected to each other.

4. The tape measure device according to claim 1, wherein said belt tape member is made of a vinyl chloride containing glass fiber.

5. The tape measure device according to claim 1, wherein said conductive ink is a compounded mix of a carbon paste and a neodymium.

6. The tape measure device according to claim 1, wherein said conductive ink is a compounded mix of a silver paste and a neodymium.

7. The tape measure device according to claim 1, wherein said belt tape member has thereon a visible graduation readable with the eye.

8. The tape measure device according to claim 1, wherein said circuit means includes a zero-setting switch to effect a resetting of a numerical value indicated on said display means and a hold switch to keep a detected numerical value on said display means.

9. The tape measure device according to claim 8, wherein said housing of said cursor is so formed that a back surface thereof is flattened and a front surface thereof fits one hand when being gripped by a user's hand.

10. The tape measure device according to claim 1, wherein said display means is provided on said cursor.

11. The tape measure device according to claim 1, wherein said belt tape member has knob members at both endmost portions thereof, and wherein said housing of said cursor is formed to have a standard measurement location thereon and is provided with a clip member on a backside of said hosing for holding one of the knob members.

12. The tape measure device according to claim 11, wherein both of said knob members have a width bigger than said belt tape member and are shaped to to fit the user's thumb.

13. The tape measure device according to claim 11, wherein said housing of said cursor includes a front half-case having thereon said display means and a back half-case detachably attached to the back of said front half-case.

14. The tape measure device according to claim 11, wherein said housing of said cursor includes a clip member for holding one of the knob members at said standard measurement location.

15. The tape measure device according to claim 1, wherein said electrically nonconductive insulative membrane is a synthetic resin film.

16. The tape measure device according to claim 15, wherein said synthetic resin film is made of polyethylene.

* * * * *

UNITED STATES PATENT AND TRADEMARK OFFICE
CERTIFICATE OF CORRECTION

PATENT NO. : 5 406 715
DATED : April 18, 1995
INVENTOR(S) : Hiroshi KOIZUMI et al It is certified that error appears in the above-indentified patent and that said Letters Patent is hereby corrected as shown below:

Column 9, line 3; change "add" to ---and---.

Signed and Sealed this

Twelfth Day of September, 1995

Attest:

BRUCE LEHMAN

Attesting Officer     Commissioner of Patents and Trademarks